(12) United States Patent
Su

(10) Patent No.: US 8,054,063 B2
(45) Date of Patent: Nov. 8, 2011

(54) MOTORCYCLE WHEEL SPEED TRANSMISSION MECHANISM FOR SPEEDMETER

(75) Inventor: Kuo-Hsin Su, Hsintien (TW)

(73) Assignee: Panochi Co., Ltd., Taipei County (TW)

( * ) Notice: Subject to any disclaimer, the term of this patent is extended or adjusted under 35 U.S.C. 154(b) by 252 days.

(21) Appl. No.: 12/385,927

(22) Filed: Apr. 24, 2009

(65) Prior Publication Data

US 2010/0271008 A1    Oct. 28, 2010

(51) Int. Cl.
*G01P 3/54* (2006.01)
(52) U.S. Cl. ............... 324/174; 73/514.39; 116/62.1
(58) Field of Classification Search .................. None
See application file for complete search history.

(56) References Cited

U.S. PATENT DOCUMENTS

| 5,880,585 | A  | * | 3/1999 | Oguro  | 324/174 |
| 7,078,891 | B2 | * | 7/2006 | Su et al. | 324/174 |

* cited by examiner

*Primary Examiner* — Minh N Tang
(74) *Attorney, Agent, or Firm* — Rosenberg, Klein & Lee

(57) ABSTRACT

A motorcycle wheel speed transmission mechanism includes a gear housing affixed to the front fork of a motorcycle and having an outside receptacle and an outside sensor mount, a driven gear mounted inside the gear housing and rotatable with the front wheel of the motorcycle, an output gear mounted in the outside receptacle and meshed with the driven gear, an annular magnet holder mounted on the gear shaft of the output gear and defining therein a plurality of equiangularly spaced magnetic zones, and a speed sensor mounted in the sensor mount and electrically connected to an electronic speedometer of the motorcycle through a transmission line for detecting the revolving speed of the annular magnet holder and transmitting detected data to the electronic speedometer for display.

11 Claims, 6 Drawing Sheets

MOTORCYCLE WHEEL SPEED TRANSMISSION MECHANISM FOR SPEEDMETER

BACKGROUND OF THE INVENTION

1. Field of the Invention

The present invention relates to the technology of detecting the speed of a motorcycle and transmitting detected data to the speedometer of the motorcycle and more particularly, to a motorcycle wheel speed transmission mechanism that fits an electronic speedometer and facilitates maintenance and repair works.

2. Description of the Related Art

A conventional motorcycle wheel speed transmission mechanism, as shown in FIG. 6, comprises a gear housing 2 affixed to the front fork of a motorcycle and coupled to one end 32 of the axle tube 31 at the front wheel hub 3 of the motorcycle, a driven gear 21 pivotally mounted in the gear housing 2 and having cut planes 211 on the periphery at one end, an output gear 22 pivotally mounted in the gear housing 2 at one side and meshed with the driven gear 21, a transmission cable 24 connected between the output gear 22 and a mechanical speedometer of the motorcycle, a driving ring 23 that has internal cut planes 231 respectively abutted against the cut planes 211 and external lugs 232. When the axle tube 31 is rotating during running of the motorcycle, protruding lugs 32 of the axle tube 31 are forced to move the external lugs 232 of the driving ring 23 and the driven gear 21, thereby causing rotation of the output gear 22, and therefore the transmission cable 24 is rotated with the output gear 22 to move the internal mechanism of the mechanical speedometer.

The aforesaid prior art design has drawbacks as follows:

1. The design is suitable for use with a mechanical speedometer, not practical for use with an electronic speedometer.
2. When the components are covered with dust after a long use or damaged, the maintenance or repair work takes much time and labor.
3. Using the transmission cable 24 to move the internal mechanism and index of the mechanical speedometer mechanically shows a significant error.

U.S. Pat. No. 7,078,891B2 discloses a speedometer gear output structure, which includes a gearbox installed in a motorcycle and holding a driven gear and an output gear for synchronous rotation with the wheels of the motorcycle, an annular magnetic device fastened to the gear shaft of the output gear for synchronous rotation, and a circuit board mounted in the gearbox and holding a sensor corresponding to peripheral magnetic zones of the annular magnetic device for outputting an output signal indicative of the speed of rotation of the output gear. This design eliminates the drawback of the aforesaid conventional mechanical design. However, because the circuit board is mounted in the gearbox, the cover of the gearbox and the related sealing structure must be detached for allowing removal of the circuit board from the gearbox when the sensor failed and a repair work is necessary. After the repair work and re-installation of the circuit board, the gearbox must be sealed gain. It takes much time and labor when a maintenance or repair work of the sensor is necessary.

SUMMARY OF THE INVENTION

The present invention has been accomplished under the circumstances in view. It is one object of the present invention to provide a motorcycle wheel speed transmission mechanism for speedometer, which is suitable for use with an electronic speedometer. It is another object of the present invention to provide a motorcycle wheel speed transmission mechanism for speedometer, which facilitates maintenance and repair works.

To achieve these and other objects of the present invention, a motorcycle wheel speed transmission mechanism for speedometer comprises a gear housing affixed to the front fork of a motorcycle, the gear housing having an outside receptacle and an outside sensor mount; a driven gear pivotally mounted inside the gear housing and rotatable with the front wheel of the motorcycle; an output gear pivotally mounted in the outside receptacle and meshed with the driven gear, the output gear having a gear shaft, an annular magnet holder mounted on one end of the gear shaft of the output gear and defining therein a plurality of equiangularly spaced magnetic zones; and a speed sensor mounted in the sensor mount and electrically connected to an electronic speedometer of the motorcycle through a transmission line and adapted to detect the revolving speed of the annular magnet holder and to transmit detected data to the electronic speedometer for display. Because the speed sensor is mounted in the sensor mount on the outside of the gear housing, the maintenance work of the speed sensor is simple.

DETAILED DESCRIPTION OF THE PREFERRED EMBODIMENT

Figure 1:
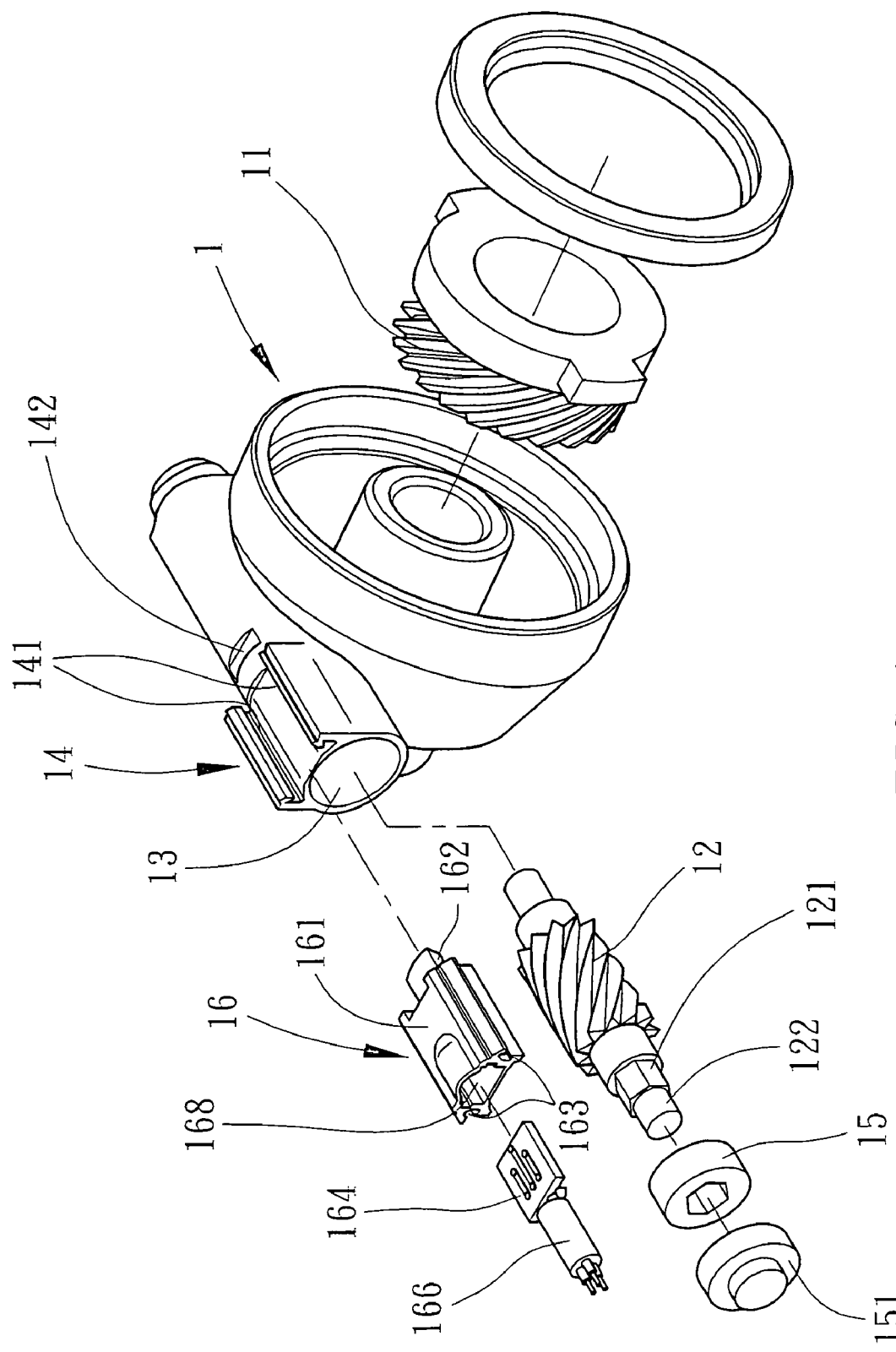
FIG. 1 is an exploded view of a motorcycle wheel speed transmission mechanism for speedometer in accordance with the present invention.
Figure 2:
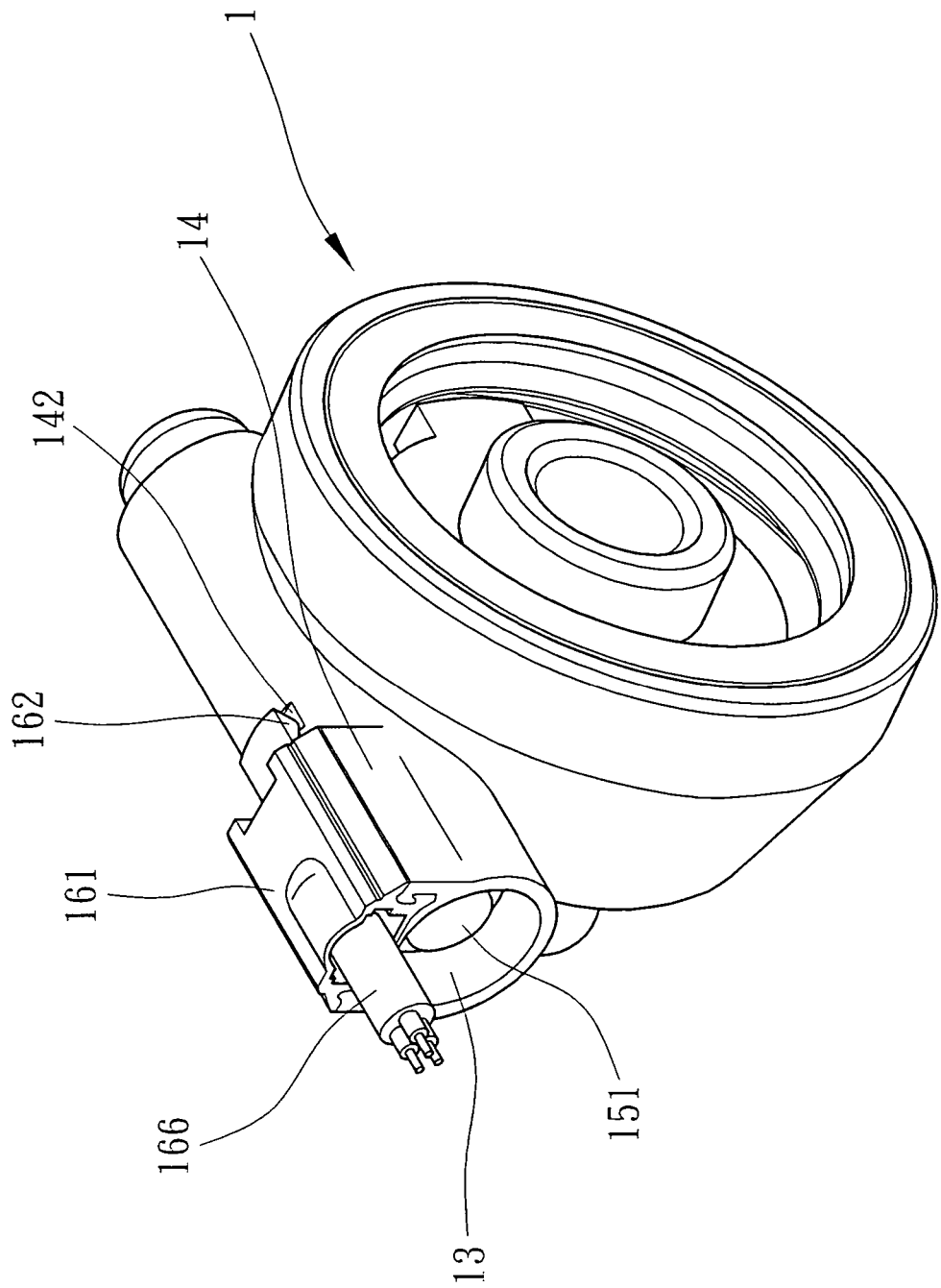
FIG. 2 is an elevational assembly view of the motorcycle wheel speed transmission mechanism for speedometer in accordance with the present invention.
Figure 3:
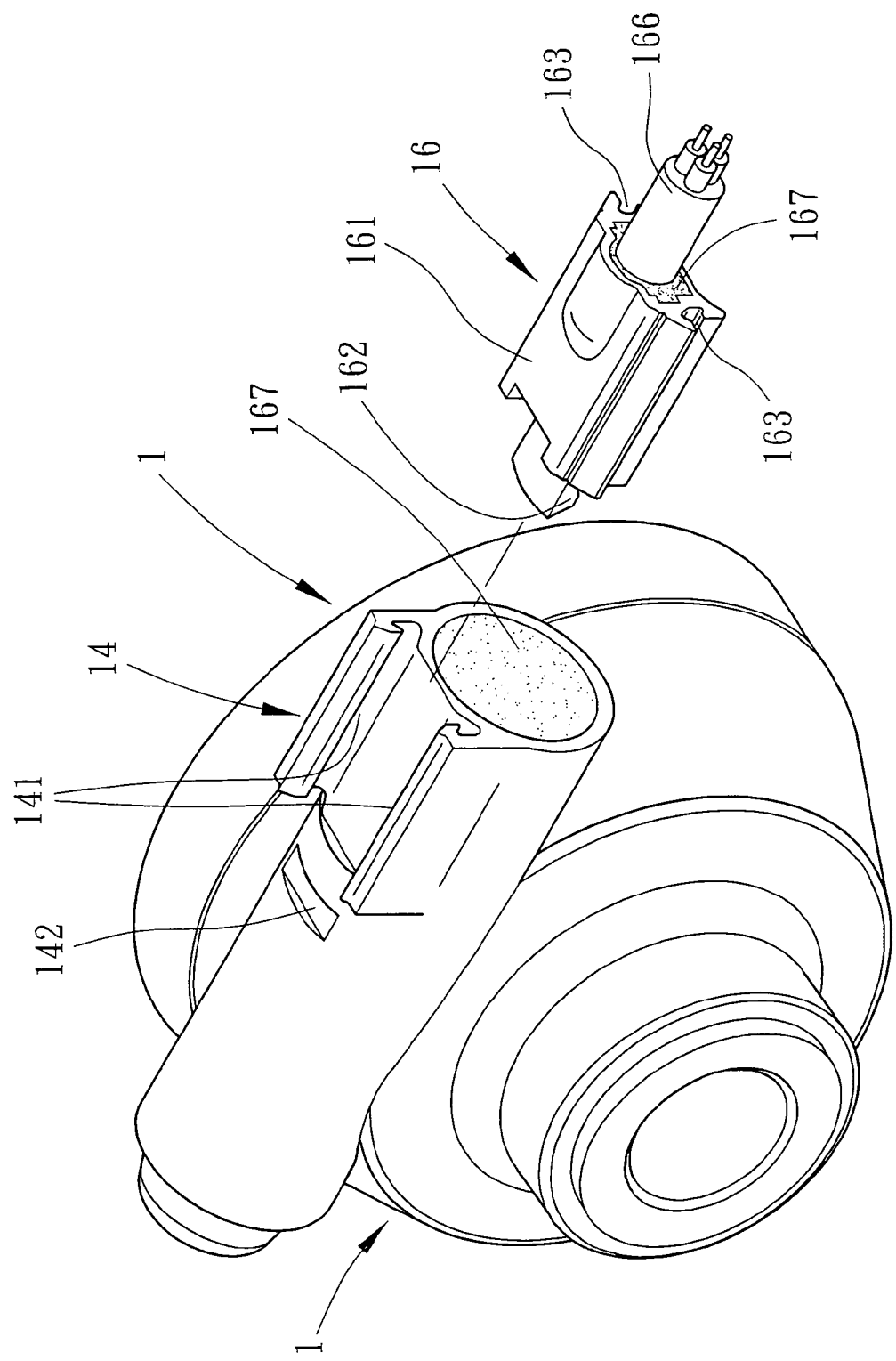
FIG. 3 is another elevational assembly view of the motorcycle wheel speed transmission mechanism for speedometer in accordance with the present invention before installation of the speed sensor in the sensor mount of the gear housing.
Figure 4:
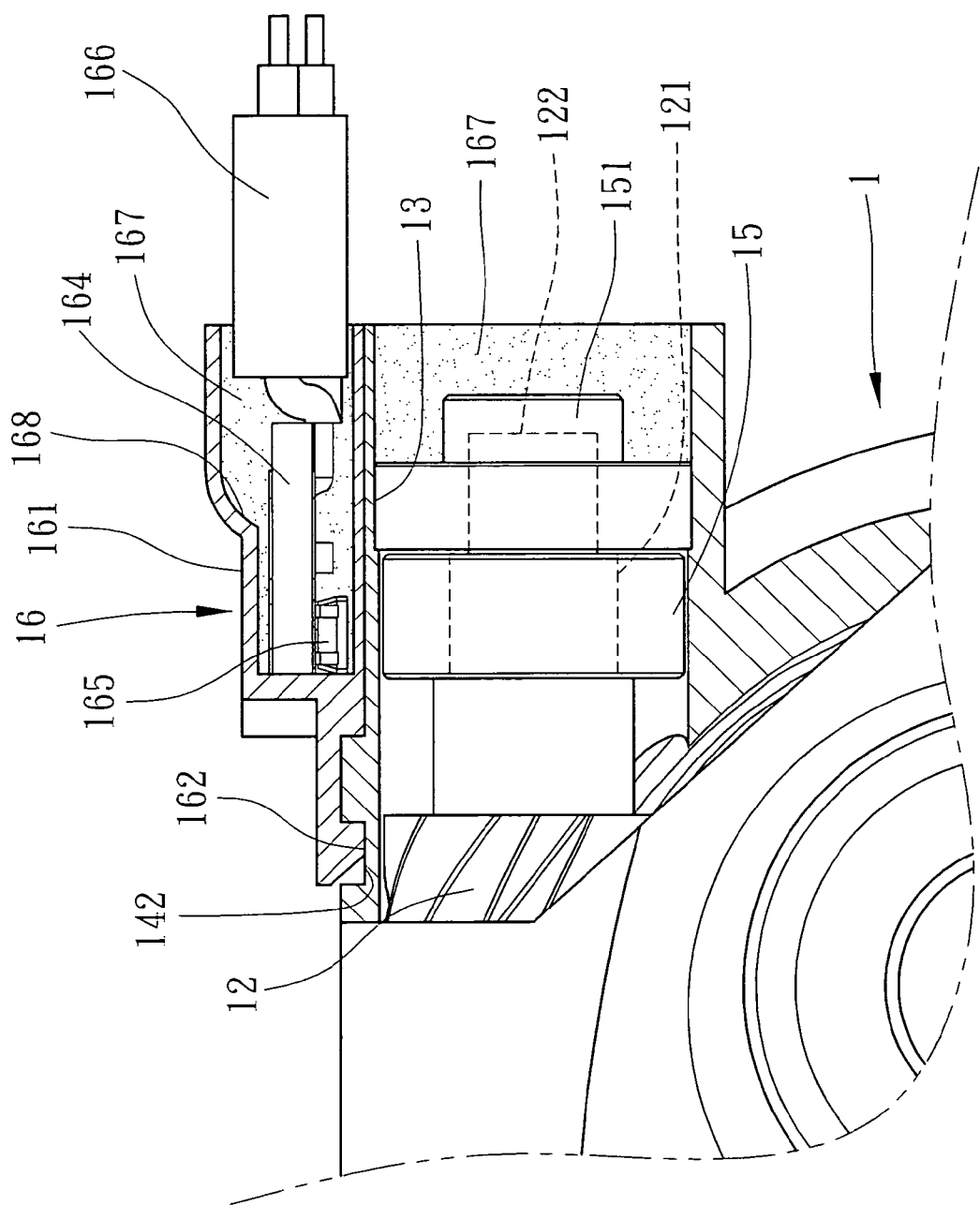
FIG. 4 is a sectional view of the motorcycle wheel speed transmission mechanism for speedometer in accordance with the present invention.
Figure 5:
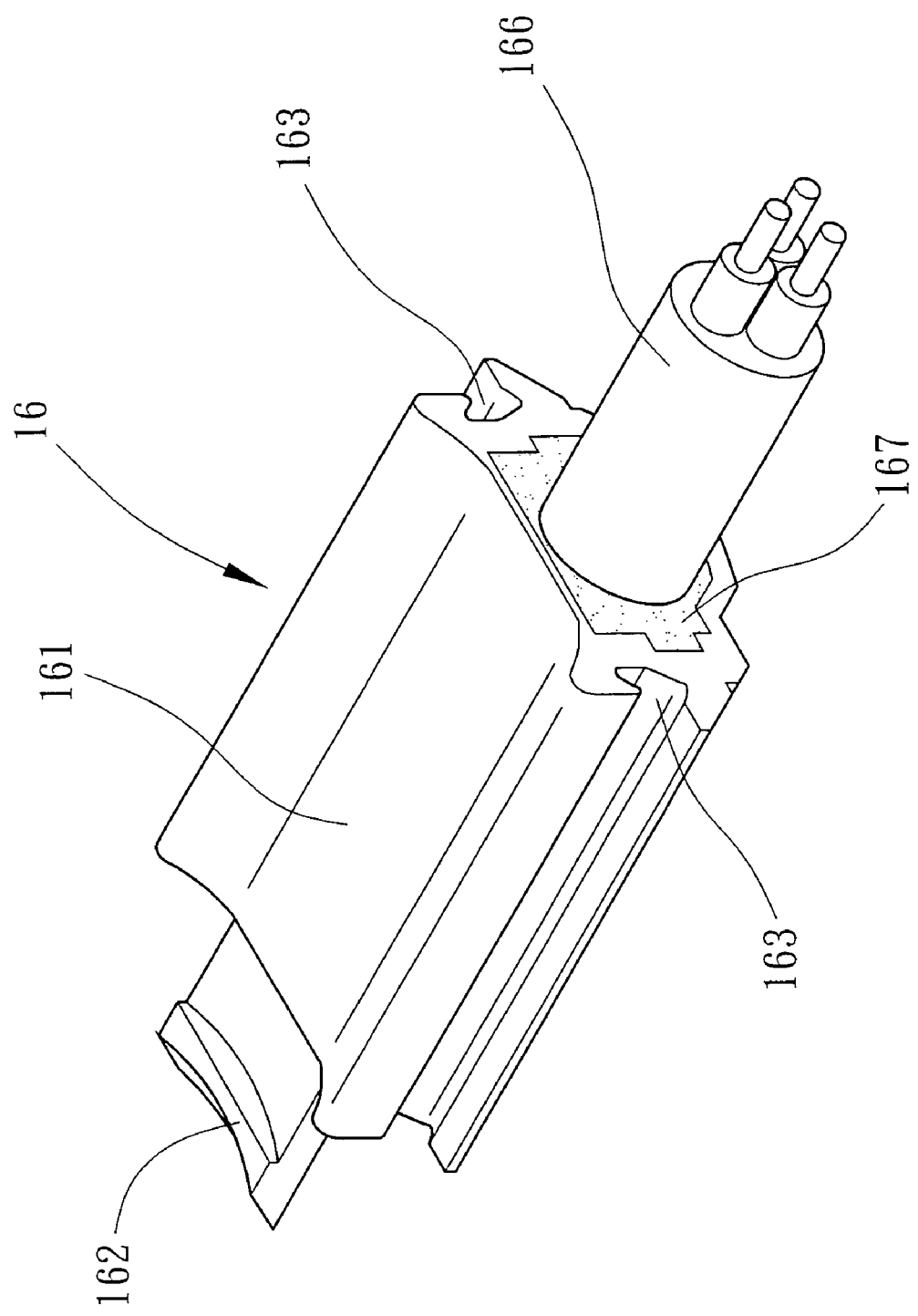
FIG. 5 is an elevational view of the speed sensor according to the present invention.
Figure 6:
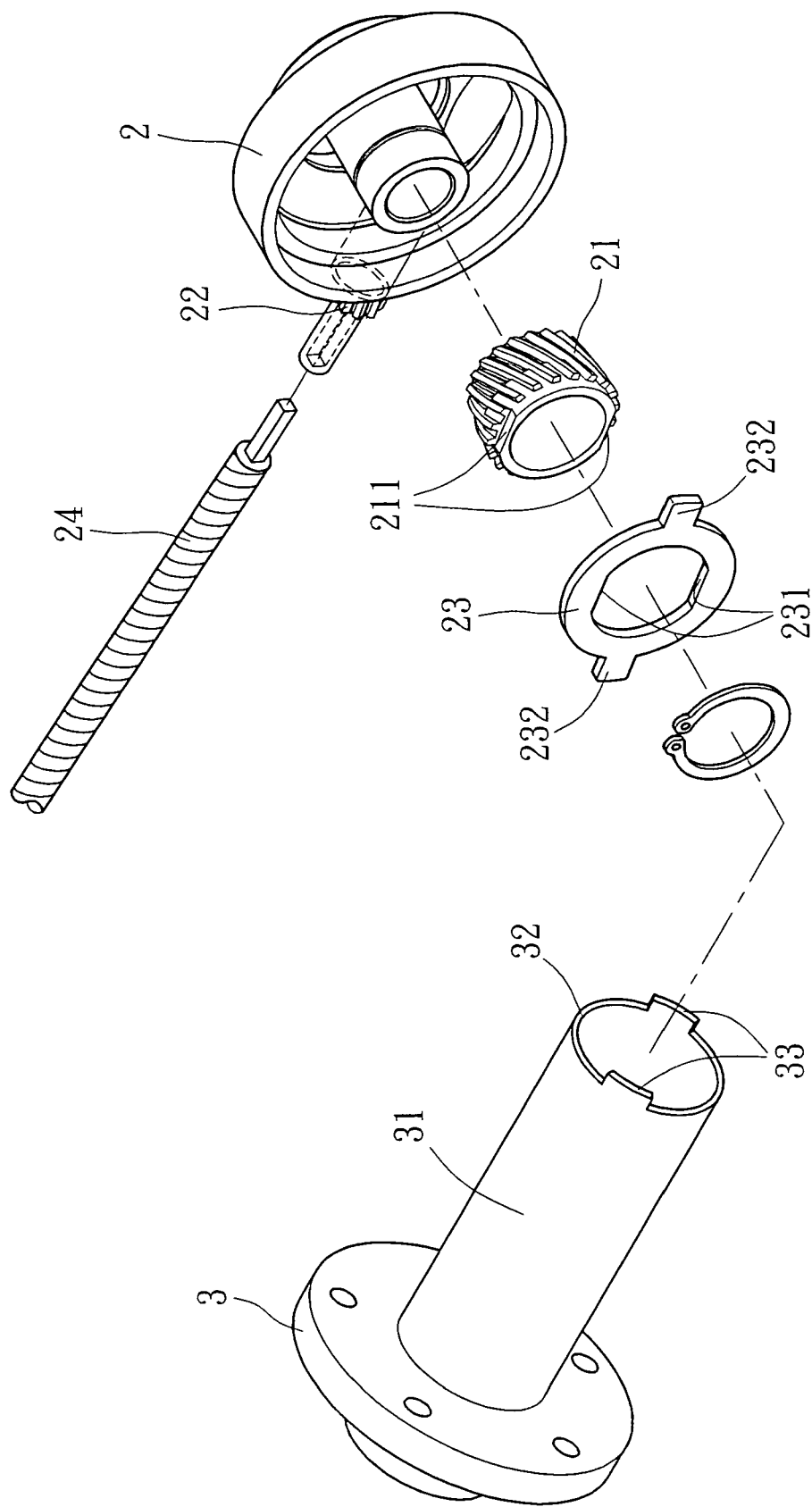
FIG. 6 is an exploded view of a motorcycle wheel speed transmission mechanism for speedometer according to the prior art.

Referring to FIGS. 1~5, a motorcycle wheel speed transmission mechanism for speedometer in accordance with the present invention is shown comprising a gear housing 1, which is affixed to the front fork of a motorcycle (not shown) and has an outside receptacle 13 and a sensor mount 14 at the top side of the outside receptacle 13, a driven gear 11 pivotally mounted in the gear housing 1 and rotatable with the front wheel of the motorcycle, an output gear 12 pivotally mounted in the outside receptacle 13 of the gear housing 1 and meshed with the driven gear 11, an annular magnet holder 15 mounted on one end of the gear shaft 122 of the output gear 12 and defining therein a plurality of equiangularly spaced magnetic zones, and a speed sensor 16 mounted in the sensor mount 14.

The speed sensor 16 comprises an insulative casing 161 that defines therein an accommodation space 168 and has two parallel sliding rails 163 respectively coupled to parallel sliding grooves 141 of the sensor mount 14 and a rear hook 162 for hooking on a hook hole 142 at the sensor mount 14, and a circuit board 164 mounted in the accommodation space 168 and carrying a sensor element 165 that can be a Hall chip or solenoid switch.

When the motorcycle is running, the driven gear 11 is rotated with the front wheel of the motorcycle to rotate the output gear 12 and the annular magnet holder 15. At this time, the sensor element 165 detects the revolving speed of the annular magnet holder 15 and transmits detected speed data through a transmission line 166 to the electronic speedometer of the motorcycle for display.

As stated above, the speed sensor 16 is mounted in the sensor mount 14 outside the gear housing 1 by means of coupling the parallel sliding rails 163 to the parallel sliding grooves 141 of the sensor mount 14 and forcing the rear hook 162 into engagement with hook hole 142 at the sensor mount 14. Therefore, the speed sensor 16 can easily be detached from the gear housing 1 when a maintenance or repair work is necessary.

Further, the gear shaft 122 of the output gear 12 has a polygonal flange 121 extending around the periphery. The inner diameter of the annular magnet holder 15 has a polygonal configuration fitting the polygonal flange 121 of the gear shaft 122 of the output gear 12 tightly. Further, after installation of the output gear 12 and the annular magnet holder 15 in the outside receptacle 13 of the gear housing 1 and installation of the circuit board 164 in the casing 161, an end cap 151 is fastened to the outside receptacle 13 to hold the output gear 12 in place, and a packing material 167 is applied to seal the outside receptacle 13 and the gap between the transmission line 166 and the casing 161.

A prototype of motorcycle wheel speed transmission mechanism has been constructed with the features of FIGS. 1~5. The motorcycle wheel speed transmission mechanism functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A motorcycle wheel speed transmission mechanism, comprising:
    a gear housing affixed to a front fork of a motorcycle, said gear housing having an outside receptacle and an outside sensor mount;
    a driven gear pivotally mounted inside said gear housing and rotatable with the front wheel of said motorcycle;
    an output gear pivotally mounted in said outside receptacle and meshed with said driven gear, said output gear having a gear shaft;
    an annular magnet holder mounted on one end of the gear shaft of said output gear and defining therein a plurality of equiangularly spaced magnetic zones; and
    a speed sensor mounted in said sensor mount and electrically connected to an electronic speedometer of said motorcycle through a transmission line and for detecting the revolving speed of said annular magnet holder and to transmit detected data to said electronic speedometer for display
    wherein said gear shaft of said output gear has a polygonal flange extending around the periphery thereof; said annular magnet holder has a polygonal inner diameter tightly fitted onto said polygonal flange of said output gear.

2. The motorcycle wheel speed transmission mechanism as claimed in claim 1, further comprising an end cap fastened to said outside receptacle to hold said output gear in place.

3. The motorcycle wheel speed transmission mechanism as claimed in claim 1, further comprising a packing material applied to seal said outside receptacle.

4. A motorcycle wheel speed transmission mechanism, comprising:
    a gear housing affixed to a front fork of a motorcycle, said gear housing having an outside receptacle and an outside sensor mount;
    a driven gear pivotally mounted inside said gear housing and rotatable with the front wheel of said motorcycle;
    an output gear pivotally mounted in said outside receptacle and meshed with said driven gear, said output gear having a gear shaft;
    an annular magnet holder mounted on one end of the gear shaft of said output gear and defining therein a plurality of equiangularly spaced magnetic zones; and
    a speed sensor mounted in said sensor mount and electrically connected to an electronic speedometer of said motorcycle through a transmission line and for detecting the revolving speed of said annular magnet holder and to transmit detected data to said electronic speedometer for display;
    wherein said speed sensor comprises an insulative casing, said insulative casing having an accommodation space and a pair of parallel sliding rails, and a circuit board mounted in said accommodation space and carrying a sensor element for detecting revolving speed of said annular magnet holder; said sensor mount has two parallel sliding grooves for the coupling of said parallel sliding rails of said insulative casing of said speed sensor.

5. The motorcycle wheel speed transmission mechanism as claimed in claim 4, wherein said sensor element of said circuit board is disposed at a bottom side of said circuit board in proximity to said annular magnet holder.

6. The motorcycle wheel speed transmission mechanism as claimed in claim 4, wherein said insulative casing has a rear hook; said sensor mount has a rear hook hole for receiving said rear hook of said insulative casing.

7. The motorcycle wheel speed transmission mechanism as claimed in claim 4, wherein said sensor element of said circuit board is a Hall chip.

8. The motorcycle wheel speed transmission mechanism as claimed in claim 4, wherein said sensor element of said circuit board is a solenoid switch.

9. A motorcycle wheel speed transmission mechanism, comprising:
    a gear housing affixed to a front fork of a motorcycle, said gear housing having an outside receptacle and an outside sensor mount located external to said gear housing;
    a driven gear pivotally mounted inside said gear housing and rotatable with the front wheel of said motorcycle;
    an output gear pivotally mounted in said outside receptacle and meshed with said driven gear, said output gear having a gear shaft;
    an annular magnet holder mounted on one end of the gear shaft of said output gear and defining therein a plurality of equiangularly spaced magnetic zones; and
    a speed sensor slidingly mounted in said sensor mount, said speed sensor including a rear hook removably engaged with a corresponding hook hole of said gear housing, said speed sensor being electrically connected to an electronic speedometer of said motorcycle through a transmission line and for detecting the revolving speed of said annular magnet holder and to transmit detected data to said electronic speedometer for display.

10. The motorcycle wheel speed transmission mechanism as claimed in claim 9, wherein said gear shaft of said output gear has a polygonal flange extending around the periphery thereof; said annular magnet holder has a polygonal inner diameter tightly fitted onto said polygonal flange of said output gear.

11. The motorcycle wheel speed transmission mechanism as claimed in claim 9, further comprising an end cap fastened to said outside receptacle to hold said output gear in place.

* * * * *